United States Patent
Ko et al.

(10) Patent No.: US 10,346,370 B2
(45) Date of Patent: Jul. 9, 2019

(54) RATE LIMITING IN A MODERATION FRAMEWORK OF A DATABASE SYSTEM

(71) Applicant: salesforce.com, inc., San Francisco, CA (US)

(72) Inventors: Kenneth Chung Kay Ko, San Francisco, CA (US); Joshua Luft-Glidden, San Francisco, CA (US); Lucas Pfister, Millbrae, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 268 days.

(21) Appl. No.: 15/273,217

(22) Filed: Sep. 22, 2016

(65) Prior Publication Data
US 2018/0060363 A1    Mar. 1, 2018

Related U.S. Application Data

(63) Continuation-in-part of application No. 15/251,334, filed on Aug. 30, 2016.

(51) Int. Cl.
  *G06N 7/00* (2006.01)
  *G06F 16/21* (2019.01)
  *G06Q 50/00* (2012.01)

(52) U.S. Cl.
  CPC ............. *G06F 16/21* (2019.01); *G06Q 50/01* (2013.01)

(58) Field of Classification Search
  CPC .. H04L 63/20; H04L 63/101; G06F 17/30867
  USPC ......................................................... 726/10
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

OTHER PUBLICATIONS

"Google Plus Users", Google+Ripples; Oct. 31, 2011; 3 pages.

(Continued)

*Primary Examiner* — Brandon S Hoffman
*Assistant Examiner* — Nega Woldemariam
(74) *Attorney, Agent, or Firm* — Schwabe Williamson & Wyatt

(57) ABSTRACT

Some external users in a public on-line community may post excessive numbers of items, causing annoyance to others and unnecessary loading on database resources. A robust moderation framework enables an individual community moderator or admin to specify a set of rules and actions to mitigate this problem. Scalable, performant rate limiting rules employ windowed counters, separately for each rule, with the counters maintained in cache memory resources outside the main database.

20 Claims, 10 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,411,952 B1 | 6/2002 | Bharat et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | |
|---|---|---|
| 2009/0177744 A1 | 7/2009 | Marlow et al. |
| 2010/0145900 A1 | 6/2010 | Zheng et al. |
| 2011/0208822 A1 | 8/2011 | Rathod |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0018906 A1 | 1/2013 | Nigam et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0026181 A1* | 1/2014 | Kiang ............... G06F 21/60 726/1 |
| 2014/0278367 A1 | 9/2014 | Markman et al. |
| 2014/0359537 A1 | 12/2014 | Jackobson et al. |
| 2017/0124472 A1* | 5/2017 | Fu ............... G06N 5/025 |
| 2018/0013764 A1 | 1/2018 | Morrison |
| 2018/0060319 A1 | 3/2018 | Ko et al. |
| 2018/0063192 A1 | 3/2018 | McGuire et al. |

OTHER PUBLICATIONS

Rolling Time Window Counters with Redis and Mitigating Botnet-Driven Login Attacks, Open Source Hacker, Jul. 9, 2014, pp. 1-7.

\* cited by examiner

FIG. 4

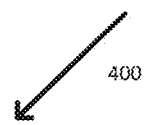

EDIT RATE RULE                                                                 400

| DETAILS |
|---|

NAME          [ FILL IN ]  — 402

UNIQUE NAME   [ FILL IN ]  — 404
                                      408
DESCRIPTION   [ Limit users from creating items more than 10 times in 3 minutes ]

ACTIVATE RULE  [✓]  — 410

412
| RULE CONDITIONS |                                                    414
|---|

APPLIES TO   [✓] POST  [✓] COMMENT   [ ] PRIVATE MSGS   [✓] FILES

MEMBER CRITERA   AVAILABLE CRITERIA   420                SELECTED CRITERIA    424

CUSTOMER USERS         * ADD *          CHATTER FREE
                                                         USERS
                 CUSTOMER USER –          ⊙
                 WITHOUT CONSENT

PARTNER USERS            ⊙
                                        REMOVE
         430

| RATE LIMITS |
|---|

CONTENT CREATION TIME        [ 3 MINUTES ]     Moderators are notified when a
       FRAME              432                  member creates content 6 times in 3
                                               minutes
NOTIFY MODERATORS            [ 6 ]

FREEZE MEMBERS     434                         Members are frozen when they
                             [ 10 ]            create content 10 times in 3 minutes
                        436

US 10,346,370 B2

RATE LIMITING IN A MODERATION FRAMEWORK OF A DATABASE SYSTEM

RELATED CASE

This application is a continuation-in-part of U.S. application Ser. No. 15/251,334 filed Aug. 30, 2016 and incorporated herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to moderating user activities in a database system.

BACKGROUND

Different networks may operate within a database system. The networks are alternatively referred to as communities and may provide customized database presentations for a group of users. These database communities may wall off different content to different user groups. For example, a community may be operated by a company and may include internal company employees and external company customers. The external customers may have access to some content posted in the community but may not be able to view other content posted by internal employees.

Communities that are open to external users may experience excessive quantifies of postings, sometimes called spam. Excessive numbers of postings in a relatively short timeframe can be taxing on the database system resources as well as annoying to other members of the community. Communities can benefit from a flexible, extensible system that enables a host or moderator to control or moderate user posting activities in a timely manner.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 4 shows an example moderation rule template with rate limits.

DETAILED DESCRIPTION

Figure 1A:
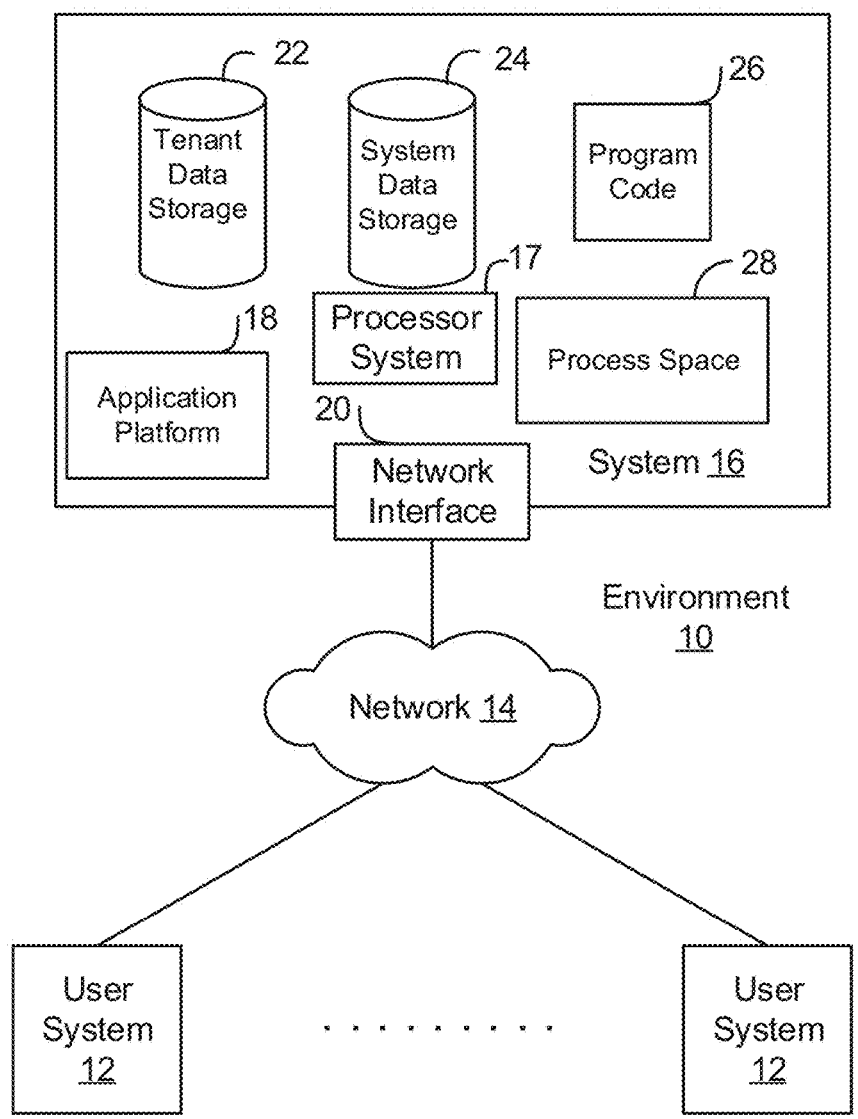
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations.

These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data, however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
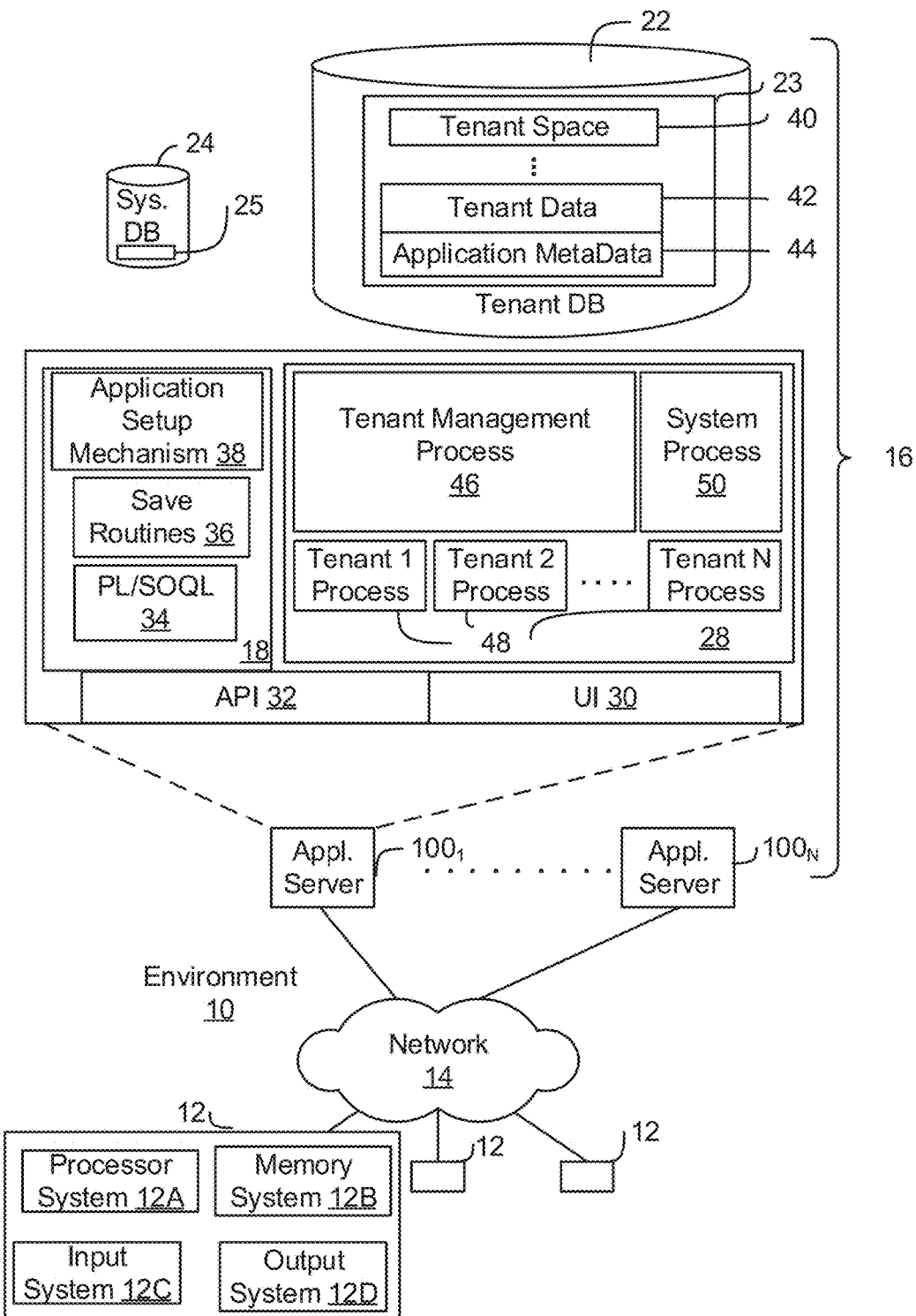
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Extensible Moderation Framework

A moderation framework monitors content posted in a database network and uses a declarative configuration scheme to define moderation rules without having to write new software. The moderation framework may perform a variety of selectable actions when different types of users and/or keywords are detected. For example, the moderation framework may replace or remove a word prior to posting the content in the database network. In another example, the moderation framework may tag the content for review prior to exposing it to non-moderators in the database network, an action alternately referred to as premoderation.

A user interface operated by the moderation framework allows selection of different user criteria and different content criteria for triggering the moderation rules. The user interface also provides selectable actions for the moderation rules to apply when the content matches the selected user and content criteria. The user interface also allows selection of different entities for associating with different moderation rules, such as accounts, cases, opportunities, Chatter® feed posts, or custom objects defined by customers.

Figure 2:
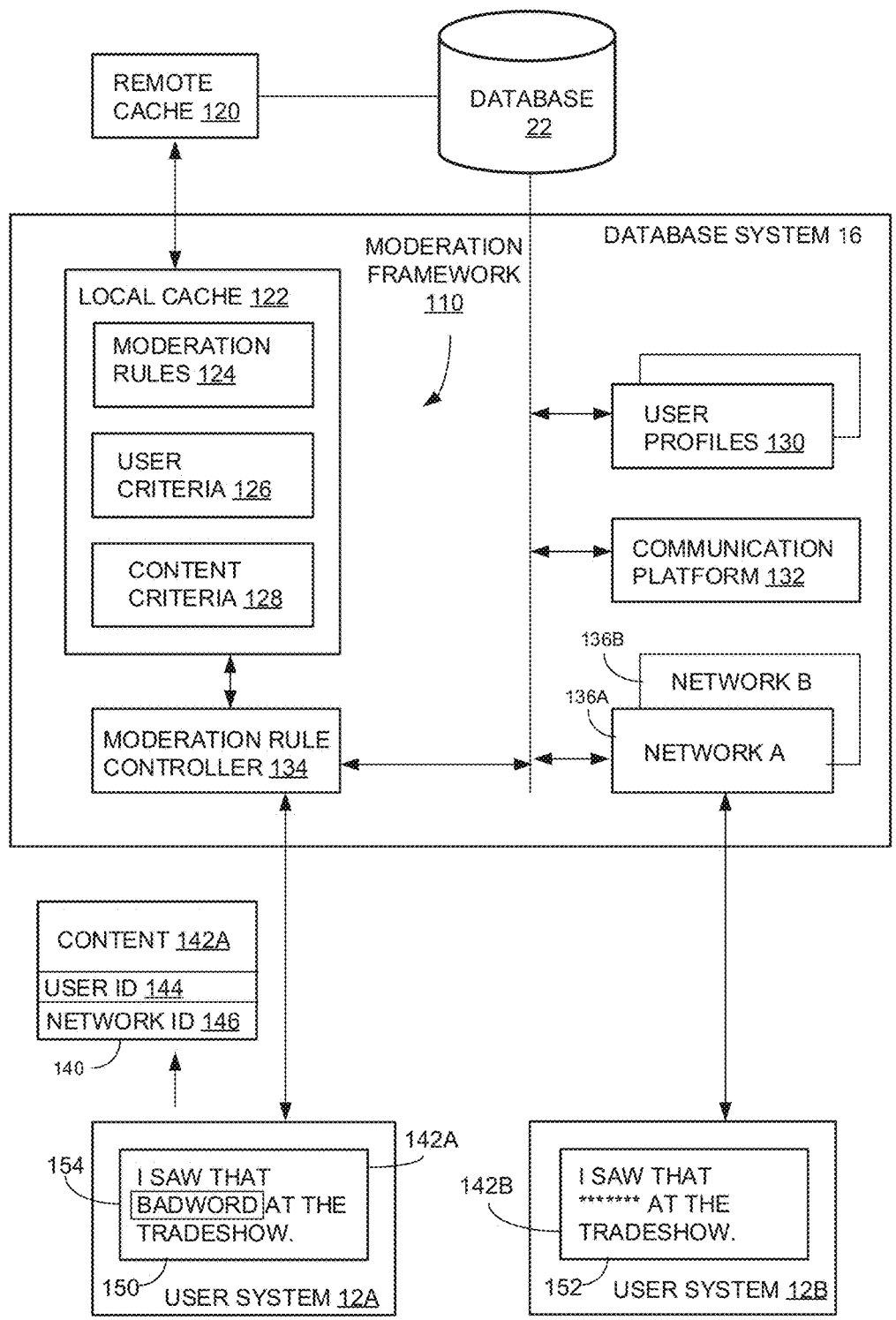
FIG. 2 shows an example extensible content moderation framework.

FIG. 2 shows one example moderation framework 110 that moderates content posted in database networks 136. The same framework can also implement other moderation rules such as rate-limiting rules. Database networks 136 may operate within database system 16 and may be associated with any community or configurable group of users. In one example, users affiliated with networks 136 may be associated with particular companies or particular organizations within a company. Different types or groups of users may be associated with a same network 136. For example, one of networks 136 may include both internal users/employees of a company and external users/customers of the company.

Networks 136 are alternatively referred to as communities and may have customized skins, electronic page colors, page layouts, etc. The communities also may wall off different content to different user groups. For example, certain employees may not be able to view certain content posted by partners and certain customers may not be able to view certain content posted by employees.

One example partnership network community 136 may include a group of contractors that access cases. A community of customers may file the cases and the contactors in partnership community 136 may work on the cases. The partnership and customer communities may have a same shared base of data. However, the customers in the customer community may not be able to view contractor conversations inside partnership community 136.

Database system 16 may define community members with user profiles and permission sets 130. Each user's profile 130 within database system 16 provides different access privileges both for accessing particular networks 136 and for accessing different content and performing different operations within networks 136. User profiles 130 also may associate users with different user categories or groups. For example, user profiles 130 may identify users as managers, engineers, salesman, customers, external users, new employees, for networks 136.

Users may use a communication platform 132, such as Chatter®, to post content in networks 136. Different users may view or post content via communication platform 132 based on associated user settings and/or permissions in user profiles 130. For example, company employees identified by user profiles 130 may view internal posts from other employees and also view external posts from external customers. External customers identified by user profiles 130 might only view content posted by other customers or posted by employees specifically for external customer viewing.

Some networks 136 may only be privately accessible by users associated with a particular organization. Other networks 136 may be publically accessible social media networks, such as Facebook®, Twitter®, Instagram®, etc. User profiles 130, communication platform 132, and networks 136 are known to those skilled in the art and are therefore not described in further detail.

Moderation framework 110 includes a moderation rule controller 134 that monitors content 142 posted by different users on networks 136. Moderation framework 110 also includes extensible moderation rules 124, user criteria 126, and content criteria 128 that rule controller 134 uses for moderating content 142. Content posted by a user may be of various content entity types, for example, a file, a message, a comment, etc.

For example, a user operating user system 12A may be a member of network 136A. The user may enter content 142A into a user interface 150 and then send a request 140 to post content 142A in network 136A. Request 140 may include a user identifier 144 identifying the user sending request 140 and a network identifier 146 identifying which network 136A to post content 142A.

Content 142A may contain one or more word or phrases 154 that one or more moderation rules 124 are configured to filter. For example, phrase 154 may include profanity or any other type of inappropriate or offensive language. In another example, phrase 154 may include a name of a competitor that one of moderation rules 124 are configured to tag for analytic purposes.

Phrase 154 is alternatively referred to as a bad word and may include any combination of alpha-numeric characters, non-alpha numeric characters, and/or other delimiters. Content 142A may include text, links, files, private messages, records, objects, or any other data capable of being sent to database system 16.

In response to receiving request 140, rule controller 134 may load moderation rules 124 associated with network 136A. In an embodiment, rule controller 134 may load moderation rules 124 from database 22 into remote cache 120. Remote cache 120 is an intermediate, distributed cache layer that lives on servers between the a main server and database 22. Rule controller 134 also may load user criteria 126 and content criteria 128 associated with the moderation rules 124.

Rule controller 134 applies moderation rules 124 to content 142A based on the user criteria 126 and content criteria 128. User criteria 126 may specify particular types of users for applying moderation rules 124. For example, user criteria 126 may identify external users that are not employees of the company affiliated with network 136A. User criteria 126 may also identify internal users who have recently joined the company.

Rule controller 134 may determine the types of users sending content 142A based on user id 144. For example, controller 134 may identify one of user profiles 130 associated with user id 144. The identified user profile 130 may identify the user as an external user.

Rule controller 134 may check content criteria 128 when the user sending content 142A satisfies user criteria 126. Otherwise, controller 134 may disregard that particular moderation rule 124. Content criteria 128 may include one or more lists of keywords for comparing with content 142A. For example, content criteria 128 may include a list of derogatory, offensive, or profane words. Rate limiting rules, further discussed below, also may host content criteria.

Rule controller 128 determines if content 142A includes any of the keywords in content criteria 128. If so, rule controller 134 performs an associated action identified in moderation rule 124. For example, the action may direct rule controller 134 to replace the matching phrase in content 142A with asterisks. Controller 134 replaces the phrase in content 142A and then posts the moderated content 142B in network 136A.

Moderation framework 110 may moderate content 142 posted on selectable networks 136 based on selectable moderation rules 124, selectable user criteria 126, and/or selectable content criteria 128. The extensible and selectable moderation rules 124 and rule criteria 126 and 128 simplify the creation and management of content moderation for database networks 136. Moderation rules 124 may include rate-limiting rules, further described later, to stop spammers from misusing the community.

Figure 3:
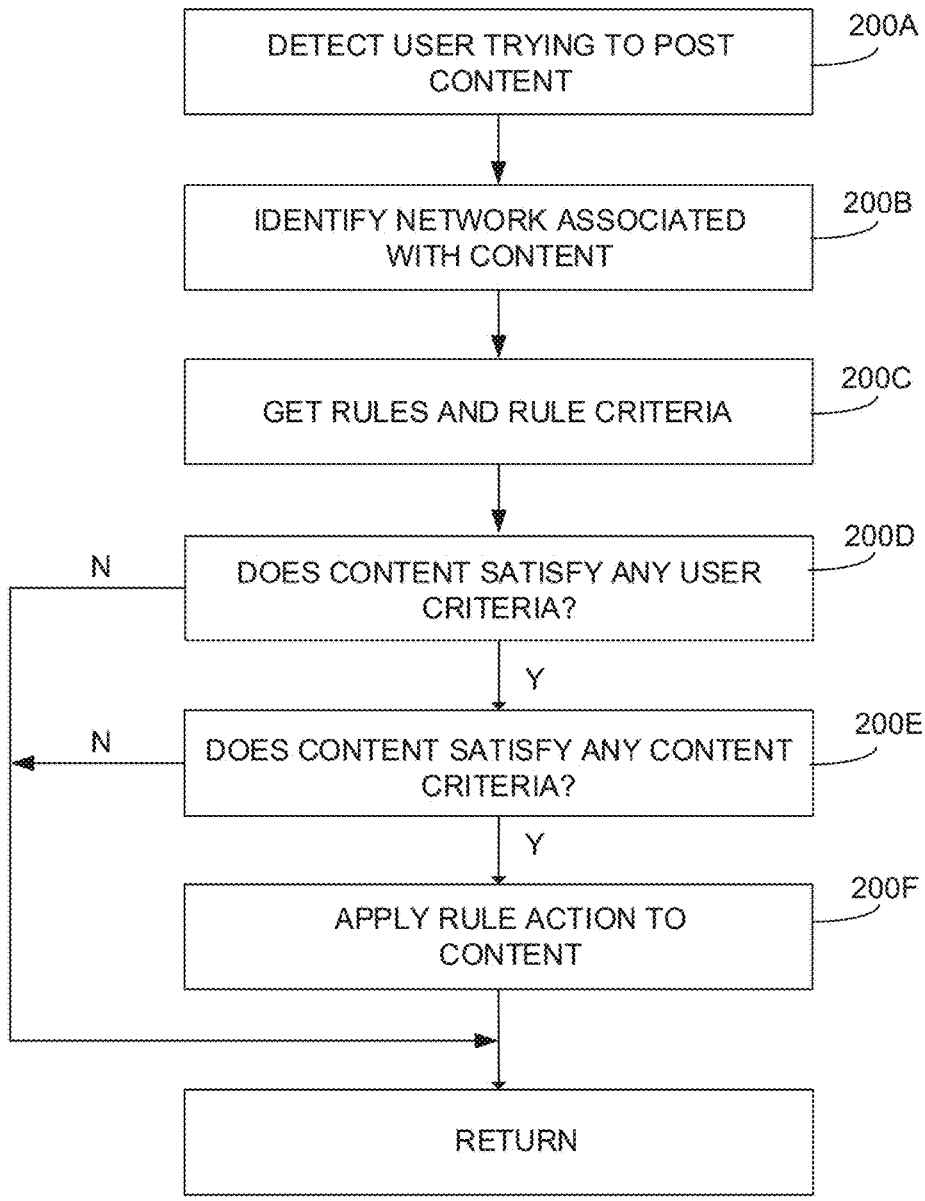
FIG. 3 shows an example process performed by the content moderation framework.

FIG. 3 shows one example moderation framework process. Referring to FIGS. 2 and 3, operation 200A detects a user trying to post content 142A and operation 200B identifies the network 136 associated with content 142A. For example, user request 140 may include a network identifier 146 for network 136A.

Operation 200C may load the rules and rule criteria for the identified network. For example, rule controller 134 may load rules 124 and rule criteria 126 and 128 associated with network identifier 146.

Operation 200D determines if the user posting content 142A satisfies any of the loaded user criteria 126. For example, rule controller 134 may determine if any profiles 130 or permissions associated with user id 144 indicate the user belongs to any of the user categories identified in user criteria 126. Rule controller 134 may post content 142A to network 136A without any further moderation when the user does not satisfy any of the user criteria 126.

When user criteria 126 does apply, operation 200E may check content criteria 128. For example, rule controller 134 may determine if any keywords in content criteria 128 match any phrases in content 142A. If not, the moderation rule 124 does not apply and rule controller 134 posts content 142A to network 136A with no moderation.

If there are keyword matches, operation 200F applies the action for the associated rule 124 to content 142A. For example, rule 124 may include a premoderation action that sends content 142A to a designated network moderator. The network moderator may review and/or edit content 142A prior to posting in network 136A.

III. Rate Limiting Rules

FIG. 4 shows an example rule template operated by the moderation framework for creating or editing moderation rules. In an embodiment, the rule template may be accessible to an authorized user, for example, a designated community host or moderator responsible for managing the community. Rule template 400 may include a name field 402 for a name of a rule, as well as an associated unique name, field 404. A description of the rule may be provided at box 408, for example, "Limit users from creating items more than 10 times in 3 minutes." This is one simple example of a rate-limiting rule. A check-box 410 may be provided to activate the rule.

Rule conditions 412 may specify what type(s) of post items or entities the rule applies to. Here, entity types post, comment and files are selected with check-boxes in field 414. Private messages are not selected so they will not be subject to this rule. Member criteria may be selected, in an embodiment, a list of available member criteria may be listed in a scrollable window 420. ADD and REMOVE buttons may be used to selectively choose criteria from those in the list 420. The selected criteria may be listed in another box 424. In this illustration, Chatter free users are selected. Other criteria not shown may be used as rule conditions. Also, content criteria may be used in a rate limiting rule.

Next is the Rate Limits area 430. In this area, the moderator may specify rate limits, i.e., what is the maximum number or count limit for posting items (by a single user) within a specified time interval or "content creation time frame." This is indicated as 3 minutes at box 432. The time interval may be entered or selected from a drop-down list of predetermined time intervals. It may be an integer within a limited range, say 1-100 minutes. Next, a selected count limit (here 6) is entered at box 434, next to the label "NOTIFY MODERATORS." This defines a rate limit—namely 6 postings within a period of 3 minutes. It also defines an action to be taken when that rate limit is exceed— namely notify moderators. Moderators may be notified by a post, an email, or any other means. In an embodiment, the rule violation may be entered into a log that the moderator may inspect at any time.

Further, in the example template 400, the moderator may enter another number (10) in box 436 next to the label "FREEZE MEMBERS." This entry in effect creates a second rate limit, namely 10 posts in the same 3 minute time interval. And it assigns a different action, namely freeze the user, to be taken if and when this second limit is met (or exceeded). To freeze the user prevents them from any further postings or "content creation" (we use the terms interchangeably). The second action is optional. Note that the template of FIG. 4 is merely an illustration; countless variations of this sort of interface can be used; the main idea being to present a convenient interface for a moderator who may not be a programmer or engineer.

Referring back to FIG. 2, user criteria lists 126 may include user identifiers (user ids) for specific users or may include profile identifiers for different user groups, user categories, or user permission levels. A first external user criteria list 126A may include profile identifiers for external customers, a second new users criteria list 126B may include profile identifiers for users that have only been members of the network for some limited period of time. The elapsed time since a new user joined a community may be one of the criteria in a rate-limiting rule. For example, a rule may limit a user to 30 posts within an hour of joining the community. That rule may not necessarily freeze the user; it may just notify the user or the moderator. Such notifications may be automatic with "canned" content. The notification may, for example, remind a new user of the terms of service or other agreements that pertain to use of the community resources. A managers criteria list 126C may include profile identifiers associated with network managers. Again, the rule controller may identify external customers, new users, managers, etc. by using user id 144 in FIG. 2 to identify the different user categories or permission levels in associated user profiles 130.

Another type of user criteria list 126 may identify users that have not posted content for some designated period of time. For example, to moderate surprise content attacks, a system administrator may create a rule 124 that provides more cautious moderation of content from users that have not posted content for some relatively long period of time.

Figure 5:
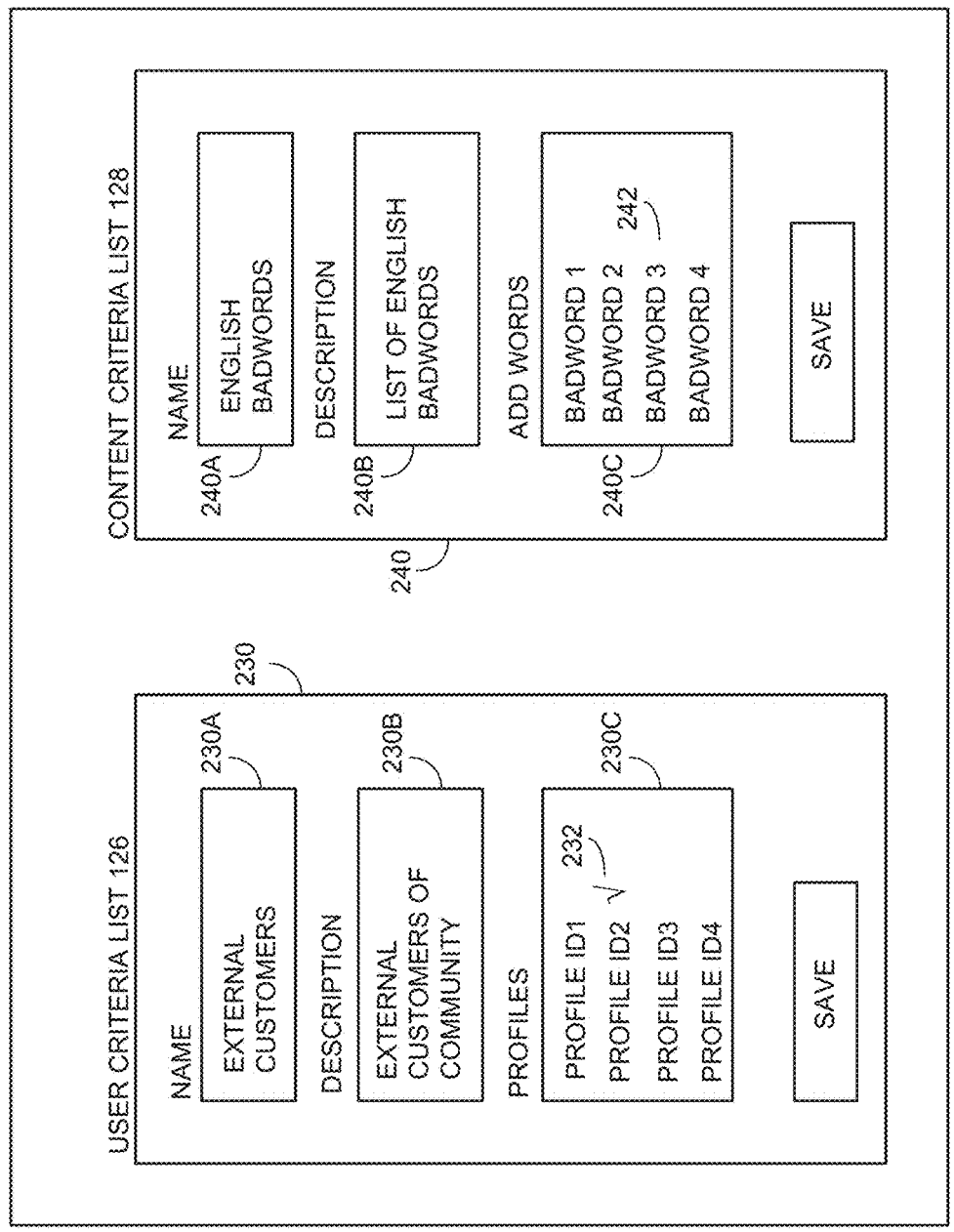
FIG. 5 shows example user and content criteria templates.

FIG. 5 shows example user criteria and content criteria templates. The moderation framework may display a user criteria template 230 for creating or editing user criteria lists 126 shown above in FIG. 4. The system administrator may enter a name for user criteria list 126 into field 230A and enter a description for user criteria list 126 into field 230B.

The system administrator may enter or select profile identifiers 230D, permissions, user identifiers, etc. displayed in field 230C for adding to user criteria list 126. As mentioned above, the database system may include different user and group profile identifiers 232 that identify types of users, user groups, or user categories. User criteria template 230 may automatically search and display different profile identifiers 232 stored in the database system associated with a particular database network. The system administrator may select any of the profile identifiers 232 in field 230C or may manually enter profile identifiers 232 into field 230C. The network administrator then saves the selected profiles identifiers 232 as part of user criteria list 126.

The moderation framework may display a content criteria template 240 for creating or editing content criteria lists 128 as shown in FIG. 5. For example, the system administrator may enter a name into field 240A and enter a description into field 240B for content criteria list 128. The system administrator may enter keywords 242 into field 240C for adding to content criteria list 128. Keywords 242 may include any word, phrase, term, character, etc. The created and/or edited user criteria list 126 and content criteria list 128 are then displayed by moderation rule template 210 described above in FIG. 5.

The extensible moderation framework creates or edits moderation rules 124 simply by selecting user criteria lists 126, content criteria lists 128, and actions 212 displayed in moderation rule template 210. Selectable intuitive user interface 210 can add, change, and/or manage moderation rules 124 without writing new software code.

Figure 6:
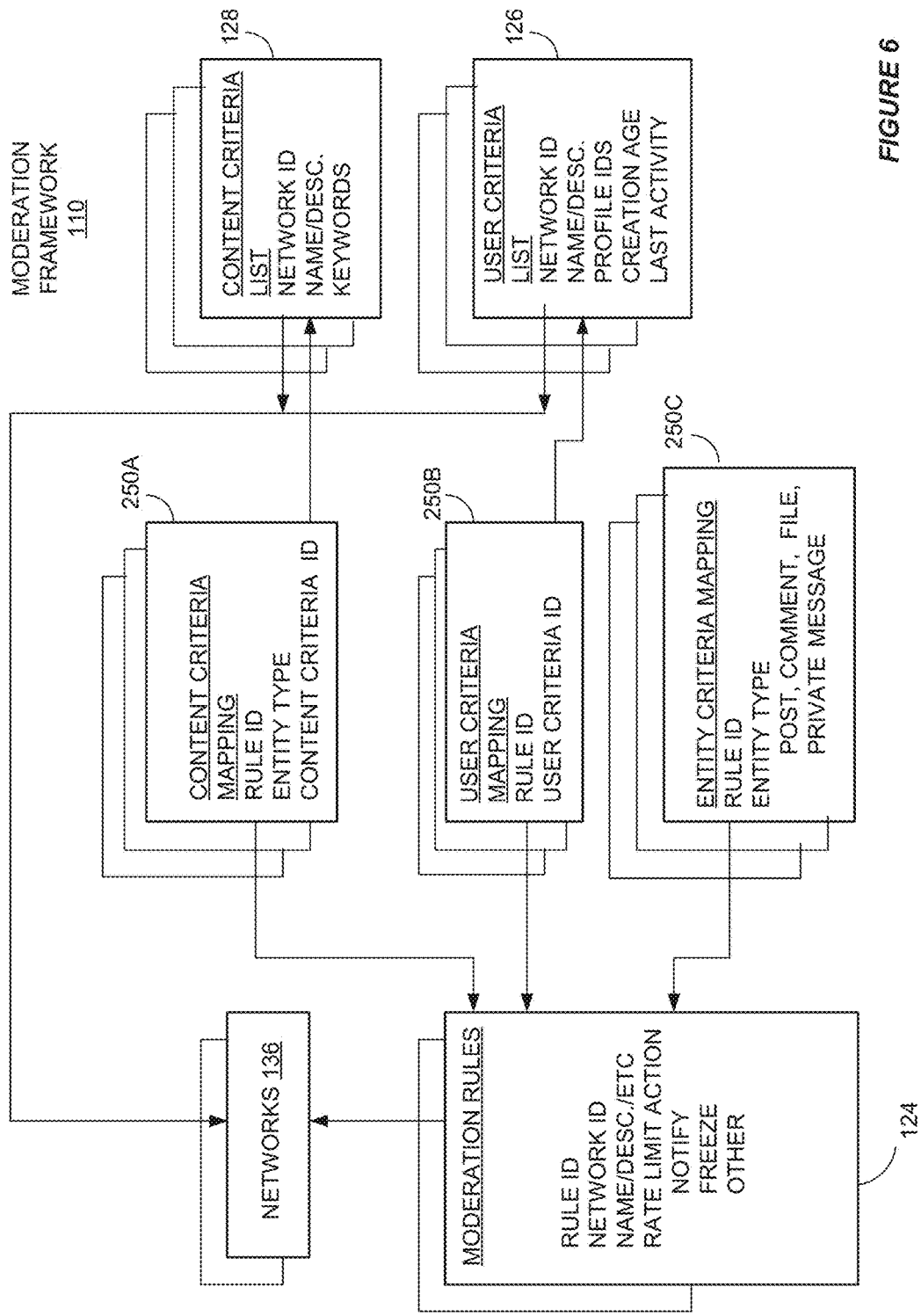
FIG. 6 shows an example data structure for the content moderation framework.

FIG. 6 shows an example data structure or software entity model for the moderation framework. Moderation rule 124 may include a name, and description as described above and include at least one action, such as a block, replace, or flag operation in the case of content rules. A rate-limiting rule may include a count limit, a time interval, and an action to be taken when the count meets or exceeds the limit within the current time interval. A network identifier may associate moderation rule 124 with one or more networks 136, communities, groups, etc.

Content criteria lists 128 may include a network identifier, name and description, and a list of keywords. The network identifier may link content criteria list 128 to a specific network 136. User criteria lists 126 may include a network identifier, name, and description. User criteria lists 126 also may include profile identifiers, creation age identifiers, and last activity identifiers.

As described above, the profile identifiers may identify different types of users that may trigger a moderation rule 124. The creation age identifier may trigger moderation rule 124 based on how long the user has been a member of a network 136. For example, new users recently been added to network 136 may trigger certain moderation rules 124 that more closely regulate posted content.

The last activity identifier among user criteria 126 may trigger a moderation rule 124 based on the last time the user accessed or posted content on network 136. The moderation platform may identify the creation age and last activity for the user from the user profiles maintained by database system 16.

Different mappings 250 link content criteria 126 and user criteria 128 to different moderation rules 124. For example, content criteria mapping 250A may include a rule identifier, entity type, and a content criteria identifier. The rule identifier in content criteria mapping 250A may link to one or more of moderation rules 124 and content criteria identifier in content criteria mapping 250A may link to one or more content criteria lists 128. The entity type in mapping 250A may identify a type of field or object for triggering the linked moderation rule 124. User criteria mapping 250B includes a rule identifier linking to one or more of moderation rules 124 and includes a user criteria identifier mapping to one or more user criteria lists 126.

Entity criteria mappings 250C may include rule identifiers linking to moderation rules 124 and include different entity types. As described above, the entity types may identify types of data or fields for triggering linked moderation rules 124. For example, entity types may identify a post, comment, file, private message, or any other type of selectable content or object entered into any selectable field, record, or any other data element.

Figure 7:
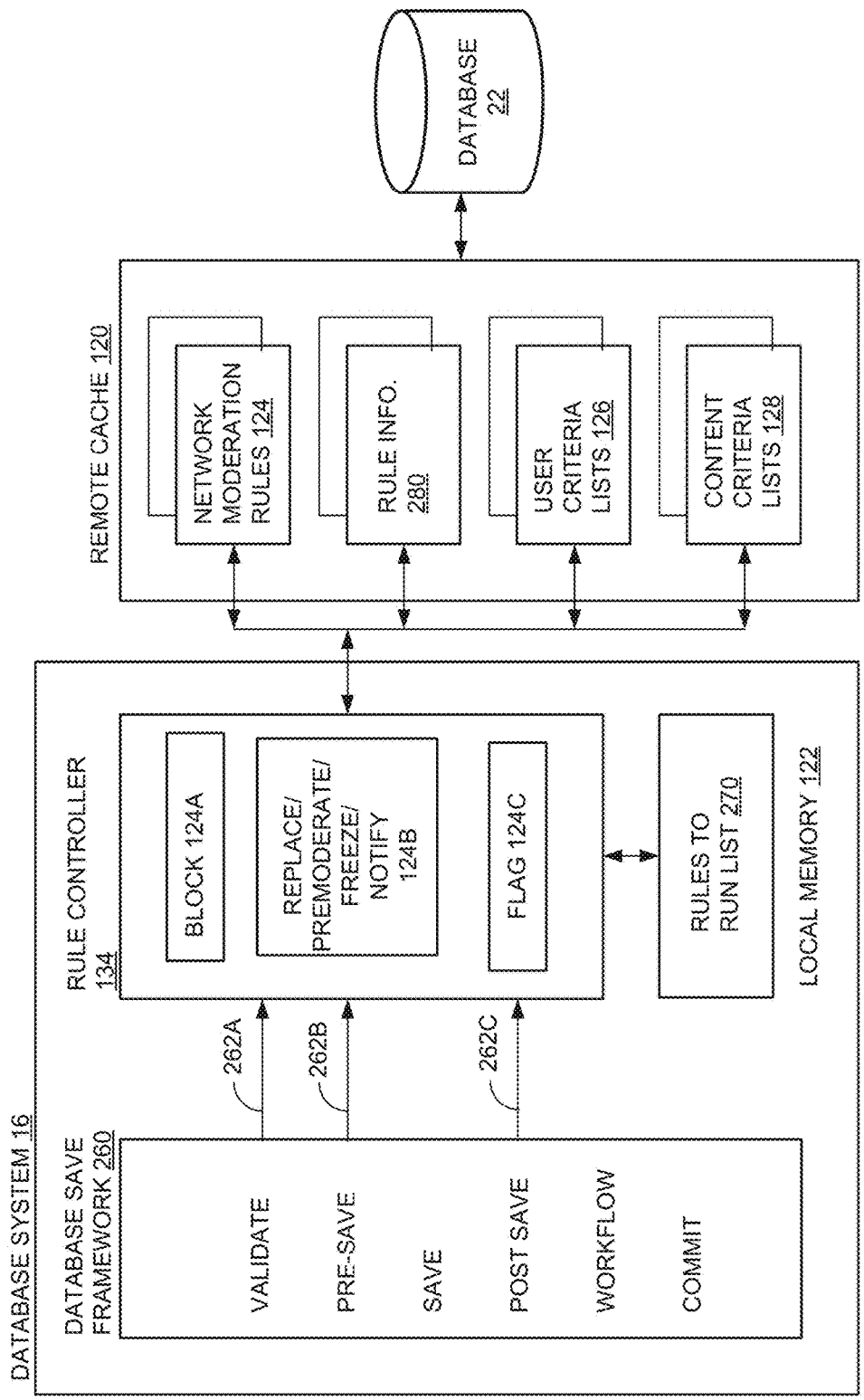
FIG. 7 shows an example triggering and storage scheme used by the content moderation framework.

FIG. 7 shows an example moderation framework for triggering and loading moderation rules 124. A database save framework 260 may generate triggers 262 when a user saves or inserts data in database system 16. For example, the save framework 260 may generate triggers 262 to invoke actions during the validation, presave, save, post save, workflow and commit phases of a save transaction in the database system 16. Save framework 260 is known to those skilled in the art and is not described in further detail.

Moderation rules 124 may trigger at different times. For example, referring to FIG. 7, validation operations in framework 260 validate the data values entered by users. Validation trigger 262A may trigger a block moderation rule 124A before database system 16 saves the content. A presave trigger 262B may trigger one or more actions such as Replace, Premoderate, Freeze or Notify, block 124B, before the content enters database system 16 for processing. A post save trigger 262C may trigger a flag moderation rule 124C since the content should be saved prior to flagging it in the database.

Figure 8:
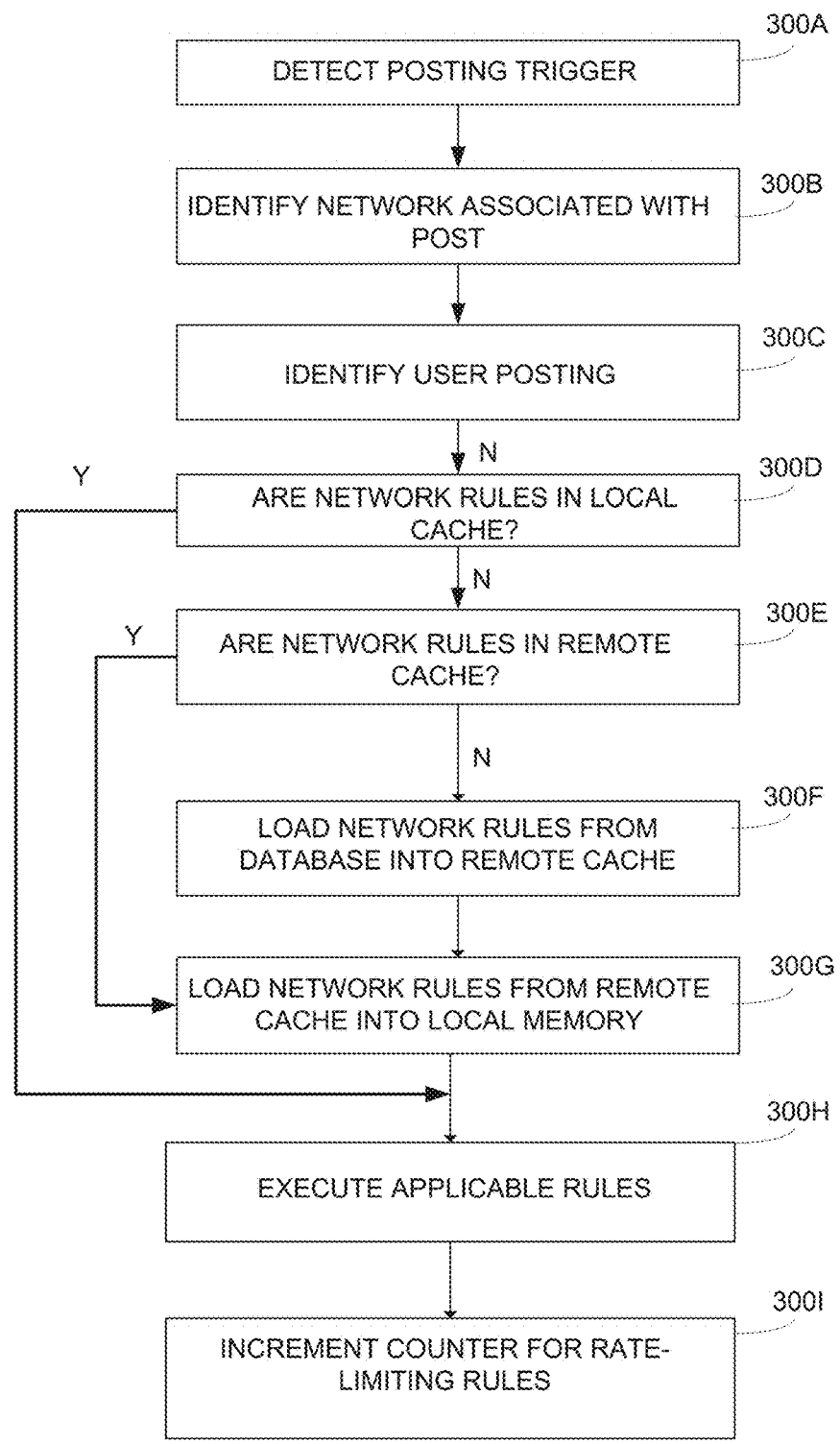
FIG. 8 shows an example process for loading and applying moderation rules and associated rule criteria.

FIG. 8 shows an example process for optimizing moderation rule execution. Referring to FIGS. 7 and 8, remote cache 120 and internal memory cache 122 may be any type of memory with relatively fast read and/or write speeds compared with database 22, such as random access memory (RAM) or Flash memory.

Operation 300A may detect a trigger 262 from save framework 260. For example, a user may send a request to the database system to post content in a particular network or community. The Operation 300B identifies the network associated with the post based on the network identifier included with the user request.

Operation 300C may identify the user making the request. The user ID is one of the possible criteria for selecting applicable rules, including rate-limiting rules. Operation 300D may determine if moderation rules 124 for the identified network and user are located in local cache memory 122. Next the logic evaluates the applicable rules, block 300H. Operation 300I increments the corresponding counters according to the applicable rate-limiting rules as further described below.

Operation 300E may determine if network moderation rules 124 are located in remote cache 120. If so, operation 300G loads the network rules from remote cache 120 into local cache 122 before performing operations 300H and 300I. If not, operation 300F may load the network rules from database 22 into remote cache 120 before performing operations 300G, 300H, and 300I.

The rule controller may load all moderation rules 124, rule information 280, user criteria lists 126, and content criteria lists 128 associated with the identified network. Moderation rules, 124, user criteria lists 126, and content criteria lists 128 can be separately loaded into both remote cache 120 and local memory 122 and are relatively static. Therefore, rule controller 134 may keep previously applied moderation rules 124, associated user criteria lists 126, and associated content criteria lists 128 in local memory 122 for subsequent content moderation.

Figure 9:
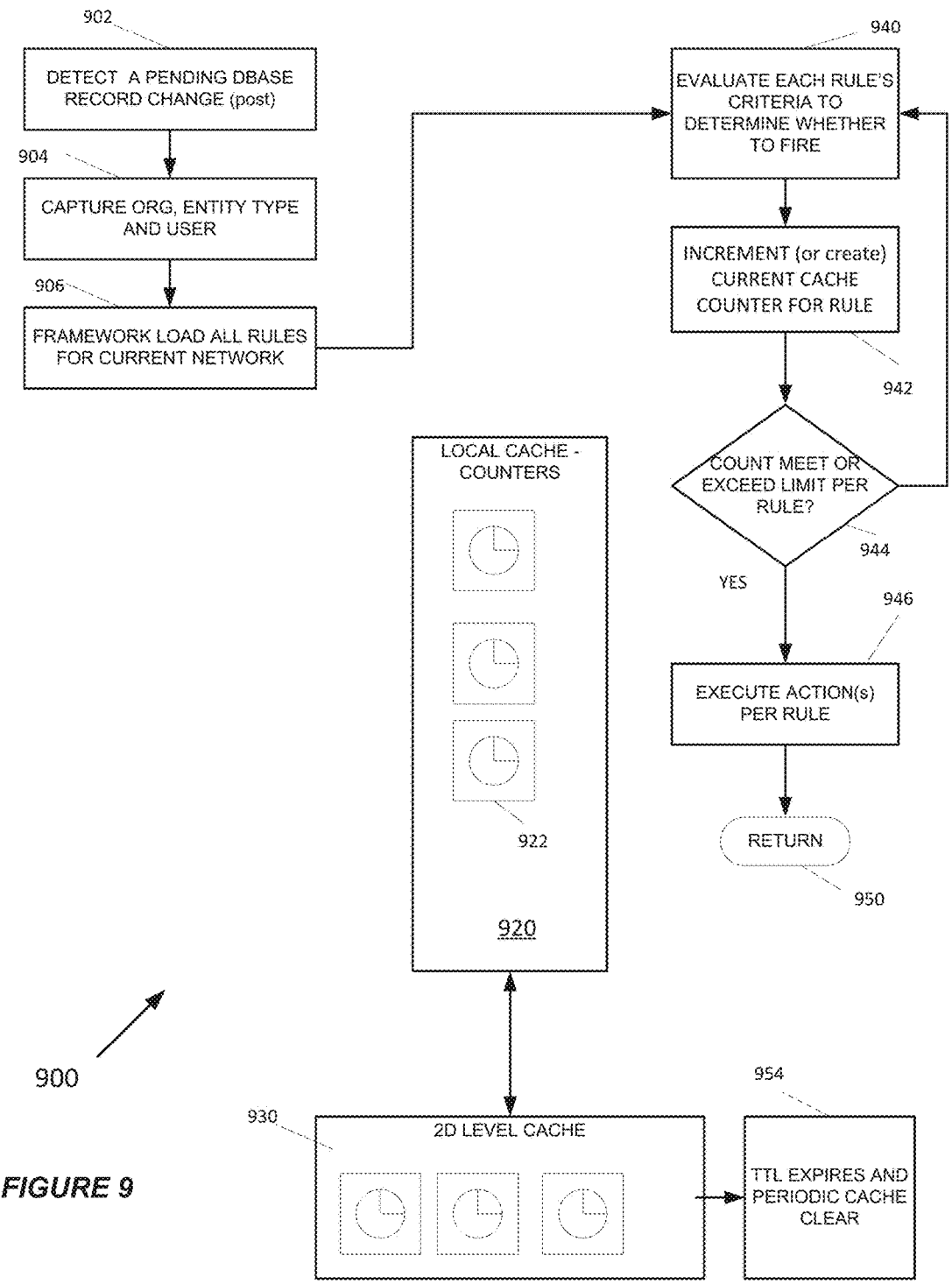
FIG. 9 is a simplified example process for executing rate limiting rules.

FIG. 9 is a simplified example process 900 for executing rate limiting rules. First, a pending database record change, for example, a pending post to the community, is detected, block 902. Various technologies are known, Apex triggers being one example, to enable performing custom actions before (or after) changes to database records, such as insertions, updates, or deletions. The moderation framework, for example, the moderation rule controller 134, may capture an organization (OrgID), entity type of the pending post, and user (UserID) of the post, block 904. The framework loads all rules for the current network (if it has not already done so), block 906. The rules may be accessed and loaded as described above.

As noted above, some rate limit rules are based on a time elapsed since the user account was created. Some new users may attempt to post quantities of spam soon after creating a new account. If one of these rules is applicable, the logic may check the time elapsed since the user account was created. This may be found in member criteria or profiles. User age is just one possible criterion for a rate rule; generally all rate limit rules will cause counts to accumulate in the current time interval or time bucket.

In general, a moderation rule can be created and implemented in the framework to utilize a variety of criteria, in almost any combination. Above, we described user criteria 126 and content criteria 128, as well as rate-limiting rules. A simple template was shown in FIG. 4 for editing rate rules, but other types of criteria can be combined in a single rule. As well, as noted above, the rule conditions or criteria can include the type of content (414 in FIG. 4), so different rules are applied to different types of content in a given network. In addition, various actions can be specified in a rule, and more than one action can be taken responsive to meeting a rule's criteria. The Table below shows a few more examples. Some of these illustrate how content criteria and user criteria may be used in rate rules.

TABLE

Additional Examples Rate Limiting Rules

| CONTENT ENTITY TYPE | CONTENT CRITERION | USER CRITERIA | COUNT | RATE TIME INTERVAL | ACTION(S) |
|---|---|---|---|---|---|
| POST | BAD LANGUAGE LIST N | INTERNAL USER | 5 | 10 MINUTES | NOTIFICATION(S) |
| COMMENT | BAD LANGUAGE LIST N | (N/A) | 10 | 15 MINUTES | FREEZE USER NOTIFY USER AND ADMIN |
| ANY | (N/A) | CUSTOMER EMPLOYEE | 5 | 20 MINUTES | PREMODERATION REVIEW |
| POST | BAD LANGUAGE LIST M | NEW USER | 3 | 20 MINUTES | REPLACE OR REMOVE WORDS OR PHRASES |
| ANY | ANY | LONG TIME SINCE LAST POST | 5 | 5 MINUTES | PREMODERATION REVIEW |
| COUNT OF OTHER RULE VIOLATIONS | | | 5 | 1 HOUR | FLAG AND NOTIFY |

Referring again to FIG. 9, based on the pending post, the logic evaluates each rule's criteria to determine whether to fire, block 940. For each rule where its criteria are met, the process increments the corresponding cache counter, or creates a windowed counter if it does not currently exist, block 942. A local cache 920 preferably is used to implement windowed counters, one of which is indicated at 922. Least Recently Used (LRU) cache may be used. In an embodiment, each "counter" may be a line in the cache memory. A separate counter is used for each active rule+user pair. For these, cache counters are created for each active rule+user+time-interval-identifier (TII) triplet. Advantageously, these counters are transient as they are not persisted to the main database, but are only held in cache memory. Key-based expiration is used to effectively "roll over" the counters from one cache counter to the next whenever the current time passes from one time interval into the next.

Referring again to block 942, after incrementing applicable counters, the process checks whether each count meets or exceeds the count limit according to the corresponding rule, decision 944. The rules framework may implement a "tracker"—an abstraction layer for these incrementing and checking steps. The tracker takes care of constructing the automatic windowing cacheKeys. In more detail, the windowed counters are realized in cache memory, utilizing a time bucket field as part of a corresponding cache key for each cache counter, wherein the time bucket field is based on the current time interval, so that upon expiration of the current time interval, the key changes to a new value, generating a new key that points to the next cache counter for the next time interval, thus automatically resetting the count to zero. If the count limit is met or exceeded, the rules framework executes the specified action(s) for the corresponding rule, block 946, and the process continues, 950.

A TTL software component will eventually (but reliably) expire all its expired, dereferenced cache counters once per each applicable time interval—i.e., the time interval specified in the corresponding rule as described above with regard to FIG. 4. For example, typical time intervals might be 3 minutes or 15 minutes or an hour. These figures are not critical; other values may be used. In an embodiment, when the tracker component handles any meteringKey request, it will build the new cachekey (block 954) by essentially appending a current time interval identifier (TII) onto it. The TII In an embodiment may be a current time (say in msec), truncated, and divided by the applicable time interval (or limit), also expressed in msec.

Whenever the current time passes from one time interval bucket into the next, every metering key handled by that tracker automatically and autonomously shifts to the next cachekey pointing to the next cache counter holding a fresh, null count. The count stored in the old cacheKey will expire itself via TTL at its own leisure, but the tracker component will always be operating on the current time interval bucket, on the correct cacheKey's cache counter.

When the tracker monitoring the counters, block 940, detects a counter value that meets or exceeds the count limit in the corresponding rule, decision 942, it executes (or causes execution of) the action specified in the rule for that count limit, block 944, and continues operation, 950, monitoring other counters.

Rate limit count tracking may add a fair number of cached counts to the second level cache 930 (for example, memcached), although this is not a problematic number in practice. At most, the framework may add one count per user per rule. These numbers can be capped. In one example, the cap may be on the order of 10 rules per organization or community. This adds a very modest amount of cached data to the system. Finally, use of TTL (time to live) parameters and periodic cache clear operations will "clean up" obsolete timers and other objects.

Utilizing expiring cache counters to track user behavior compromises count tracking consistency in exchange for scalability and performance. Under this scheme, a user may be able to exceed a limit n by posting n−1 times just before a time interval ends and posting another n−1 times just after, or a user's cache counts across multiple local caches may not immediately reconcile together to discover that their total exceeds n, but the absolute number of postings a user could push through this scheme is generally bounded, and is bounded without establishing write-locks on tracking counters for every user posting.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A rate-limiting method for a database system that implements a main database and implements a public community feed that enables members of the public community to post items to the feed over a network, to moderate the posting of items to the feed, the method comprising the steps of:
   creating a set of at least one rate-limiting rule associated with the public community feed; wherein the rate-limiting rule specifies a type of user, a repeating time interval, an item count limit, and an action;
   storing the set of rate-limiting rules in a cache system in the database system outside of the main database;
   selecting and loading at least one of the rate-limiting rules from the cache system for execution, wherein execution of the selected rule includes—
   provisioning a tracker for the repeating time interval, wherein the tracker is implemented in the cache system outside of the main database, and the tracker is configured to automatically track the number of items posted to the feed during each time interval by each user of the specified type, utilizing windowed counters so as to reset each user's posted item count upon expiration of each time interval, each windowed counter utilizing a time bucket field based on the repeating time interval; and
   upon detecting that a first user's posted count meets or exceeds the item count limit in the selected rule, executing the action specified in the rule with regard to the first user.

2. The method of claim 1 wherein the rule specifies a type of user to which the rule applies, wherein the type of user is selected to include at least one of customer users and internal users.

3. The method of claim 1 wherein the rule specifies target users based on a time elapsed since the user was created.

4. The method of claim 1 wherein the rule specifies at least one type of item entity to be moderated by the rule.

5. The method of claim 1 wherein the rule includes at least one action, wherein each action is triggered by the first user's posted count exceeding a corresponding rate limit.

6. The method of claim 1 wherein the actions may include at least one of the following actions: notification, freeze user, block, replace, premoderate and flag.

7. The method of claim 1 using transient windowed counters to track and react to patterns of user behavior.

8. The method of claim 7 wherein the windowed counters are realized in cache memory, the time bucket field is part of a corresponding cache key for each cache counter, wherein upon expiration of the current time interval, the key changes to a new value, generating a new key that points to the next cache counter for the next time interval, thus automatically resetting the count to zero.

9. The method of claim 8 including implementing the cache memory in at least a two-phase cache, wherein a first level of the cache is stored in local memory in an application server, and flushing the first level cache periodically to a cache server outside of the main database.

10. A system for moderating items posted in a network operating within a database system, comprising:
    a hardware processor; and
    memory storing one or more stored sequences of instructions which, when executed by the processor, cause the processor to carry out the steps of—
    displaying a rate limiting rule template to selectively associate a rate limiting rule with the network, the rule limiting the rate at which items can be posted in the network;
    displaying in the rule template one or more user criteria lists to selectively associate with the rule, the user criteria lists identifying types of users associated with the network;
    displaying in the rule template one or more rule conditions to selectively associate with the rule, the rule conditions selecting at least one type of items to which the rule applies;
    displaying in the rule template one or more content criteria lists to selectively associate with the rule, the content criteria lists identifying content to which the rule applies;
    displaying in the rule template input fields for entering a rate limit, the rate limit comprising a repeating time interval and an associated item count limit;
    displaying one or more actions in the rule template to selectively associate with the rule, the specified action(s) to be applied when the item count limit of the rule is met or exceeded within the associated repeating time interval;
    storing the rate limiting rule as created or modified by inputs to the rule template;
    provisioning a tracker for the repeating time interval of the rate limiting rule; and
    configuring the tracker to automatically track the number of items posted in the network during each time interval by a user of a specified type, with one or more windowed counters that reset the user's posted item count upon expiration of each time interval, each windowed counter utilizing a time bucket field based on the repeating time interval.

11. The system of claim 10, wherein the instructions further cause the processor to carry out the steps of:
    loading one or more rate-limiting rules associated with the network from a database into a local memory;
    comparing the user criteria lists associated with each rate-limiting rule to the types of users posting the items;
    discarding each rule with associated user criteria lists that do not match the types of users posting the content;
    applying each loaded rule that is applicable to a user posting items; including
    executing the specified action(s) for each rule when the rule's limit is met or exceeded by the rule's counter.

12. The system of claim 10, wherein the rate limiting rule has a time interval that is measured from a time that the user created an account in the network, so that the rule limits a number of items that may be posted during the specified time interval elapsed since the user created the account.

13. The system of claim 10, wherein the rate limiting rule has a time interval that is measured backward from a current time.

14. The system of claim 10, wherein the specified action includes a notification.

15. The system of claim 14, wherein the notification is sent to one or more moderators of the network community.

16. The system of claim 10, wherein the specified action includes at least one of the following actions: notification, freeze user, block, replace, premoderate and flag.

17. The system of claim 10, and further comprising updating a log based on the rule violation, the log accessible to one or more moderators of the network community.

18. A moderation platform for moderating items to be posted in a network operating within a database system, comprising:
- user profiles stored in the database system to identify user categories for users belonging to the network;
- one or more user criteria lists stored in the database system, the user criteria lists identifying at least one of the user categories;
- one or more content criteria lists stored in the database system, the content criteria lists identifying selected content;
- one or more rate-limiting rules to control the rates at which a user may post items to a community in the network;
- a rule template to create or edit rate-limiting rules, the rule template including:
- a user criteria field to display the user criteria lists and receive selections of the displayed user criteria lists to link to the rate-limiting rules,
- a rule criteria field to display and receive selections of types of items to be subject to the rules,
- a content criteria field to display and receive selections of the displayed content lists to incorporate into the rules,
- a rate limit field to receive selections of a repeating time interval and associated count limit value, and an action field to display actions and receive selections of the actions to associate with the rate-limiting rules, wherein the rate-limiting rules as defined by the template are stored in the database system;
- a rule controller to select applicable rules, and to apply the corresponding actions based on a user's posting activity meeting the criteria of a selected rule; and
- a tracker for the repeating time interval of each of the one or more rate-limiting rules, each tracker configured to automatically track the number of items posted to the community during each time interval by a user of a specified category, with one or more windowed counters that reset the user's posted item count upon expiration of each time interval, each windowed counter utilizing a time bucket field based on the repeating time interval.

19. The moderation platform of claim 18, wherein the user categories identified by the user criteria lists include new users joining the network within an identified period of time.

20. The moderation platform of claim 18, wherein the rules are cached outside of the main database in transient cache memory for use.

* * * * *